United States Patent [19]
Cohen

[11] Patent Number: 5,121,980
[45] Date of Patent: Jun. 16, 1992

[54] SMALL APERTURE MULTIFOCAL

[76] Inventor: Allen L. Cohen, 10010 Walsham Ct., Richmond, Va. 23233

[21] Appl. No.: 340,496

[22] Filed: Apr. 19, 1989

[51] Int. Cl.$^5$ .................. G02C 7/04; G02B 27/44; A61F 2/16
[52] U.S. Cl. .................. 351/161; 351/168; 359/565; 359/569; 359/571; 359/575; 623/6
[58] Field of Search ............... 351/160 R, 160 H, 161, 351/162, 168; 350/162.16, 162.22; 623/6; 359/565, 569, 571, 575

[56] References Cited
PUBLICATIONS

Genovese et al; "Phase Plate Lens for a Multiple Image System"; *IBM Tech. Discl. Bulletin*; vol. 8, No. 12; May 1966; pp. 1796-1797.

Primary Examiner—Scott J. Sugarman
Attorney, Agent, or Firm—Finnegan, Henderson, Farabow, Garrett & Dunner

[57] ABSTRACT

An optical device suitably employable in intraocular and contact lenses that employs a phase zone plate of a Cohen lens design that relies on a small number of zones to provide multifocal images.

34 Claims, 17 Drawing Sheets

VERTICAL SCALE IS 146X'S THE HORIZONTAL SCALE ACCORDING TO $r_k = \sqrt{kd\lambda}$ VERTICAL SCALE IS 146X'S THE HORIZONTAL SCALE ACCORDING TO $r_k = \sqrt{kd\lambda}$

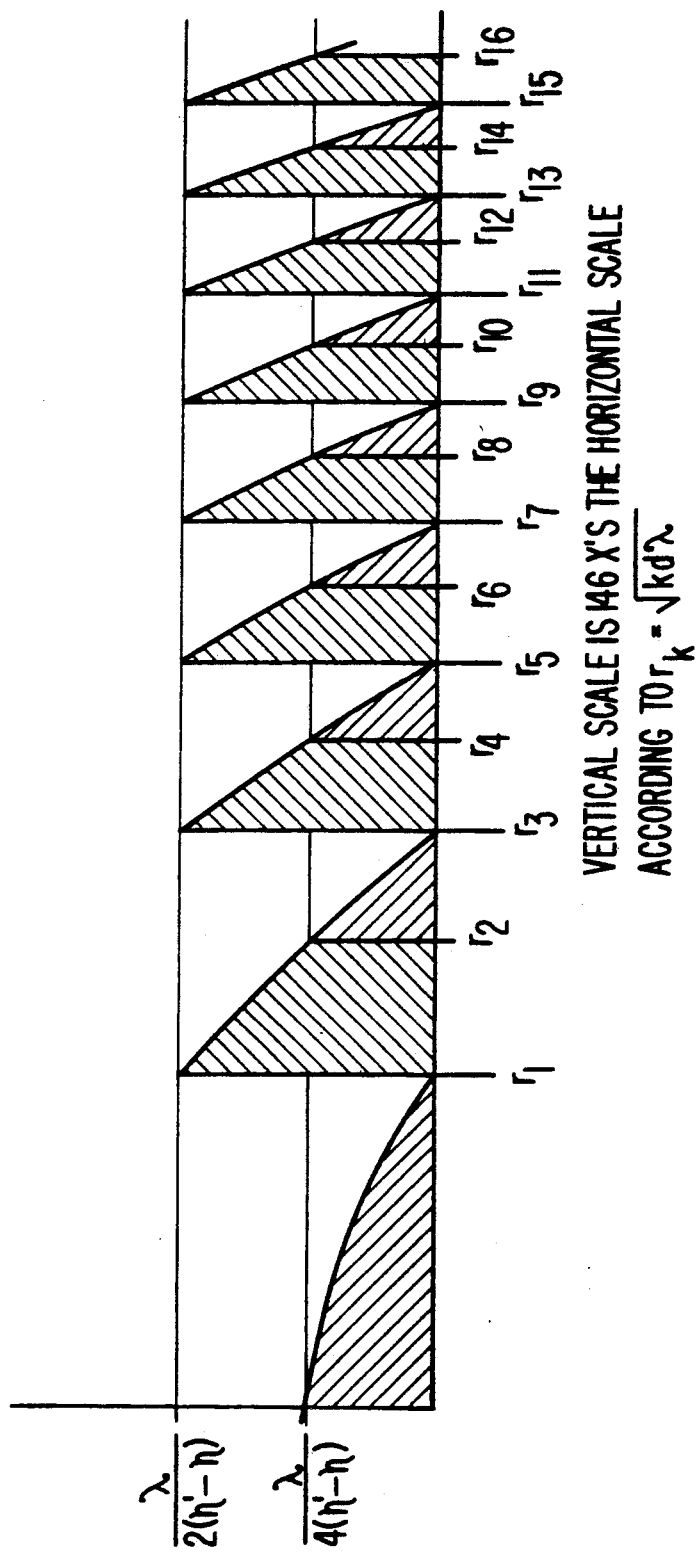

SMALL APERTURE MULTIFOCAL

BRIEF DESCRIPTION OF THE INVENTION

An optical device suitably employable in intraocular and contact lenses that employs a phase zone plate of a Cohen lens design that relies on a small number of zones to provide multifocal images.

BACKGROUND TO THE INVENTION

Refraction and diffraction are two mechanisms by which optical effects are characterized. Diffraction theory concerns itself with the propagation of light. It is generally useful to consider the particular case of propagation through an aperture. The aperture may be an empty region defined simply by its boundary. Or it may be a region of optical material of varying thickness and/or varying refractive index, so as to selectively retard various portions of the incident wavefront. In any case, as light squeezes through such an aperture it is said to undergo 'diffraction'.

Sometimes when light passes through an aperture, there is found to exist a point in space where the light seems to be concentrated or focussed. There exists a subset of these situations wherein this focal point can be calculated by use of a simple equation known as Snell's Law. These special cases occur when the optical material contained within the aperture is smoothly and very slowly varying, and the dimensions of the aperture are large. When all of this is true, light can be characterized as being propagated by the special case of diffraction that is called 'refraction'.

However, because this situation is so common, refraction is often viewed to be a complete theory. But in the case where there are sharp cuts in a lens, the 'smoothly varying' requirement is violated and the calculation of light propagation requires the more general theory of 'diffraction'.

The term 'refraction' would be used whenever circumstances involved only apertures with smoothly varying internal structures. The term 'diffraction' would be used whenever circumstances involved apertures whose internal structures comprised sharp boundaries and abrupt changes in optical path lengths.

Even in the simple cases however, diffraction theory is used for an exact solution that would not be obtainable using refraction theory.

The operation of any lens can be explained by the laws and rules pertaining to diffraction whereas the laws and rules pertaining to refraction will not explain the operation of a phase zone plate in a carrier lens. A "phase zone plate" (as employed herein and in the claims) is a unitary optical region of a lens utilizing the combination of a zone plate and optical facets in the zones, said combination diffracts light to produce a specific wavefront which results in a specific intensity distribution of light at the various order (e.g., $0^{th}$, $1^{st}$, etc.) foci of the zone plate.

The Cohen patents [Allen L. Cohen, U.S. Pat. Nos. 4,210,391; 4,338,005; and 4,340,283 ("Cohen patents")] are directed to the use of phase zone plates in the optic zone of a carrier lens to achieve a multifocal effect. A lens that utilizes a phase zone plate in the optic zone of a carrier lens to achieve a useful multifocal effect is characterized herein and in the claims hereof to be a "Cohen lens design." The optical properties and utility of a Cohen lens design is explained in terms of the laws and rules relating to diffraction.

A Cohen lens design utilizes a phase zone plate design of concentric zones wherein the radii "$r_k$" of the concentric zones are substantially proportional to $\sqrt{k}$ and the zones are cut so as to direct or diverge light to more than one focal point. This $\sqrt{k}$ spacing is unique to diffraction and there is no analogous spacing pattern that occurs in refractive lens design.

A phase zone plate which generates a multifocal image is a lens and can be used independent of a carrier lens for the purpose of magnification or minification. When a phase zone plate is placed in carrier lens, and it dominates the optic zone region of the carrier lens, it will control the relative brightness of the multiple images created by the lens device. In addition, such a phase zone plate that dominates the optic zone region of a carrier lens device will contribute to the quality and nature of the image at a given foci. The significance of such a phase zone plate is its ability to control the transmitted light to the various orders as evidenced by the various foci, the chromatic dispersion effects at the various orders and the reduction in intensity of the light at the various orders, reflecting efficiency loss inherent in a multifocal phase zone plate. For example, a divergent or convergent or plano lens will dictate the magnification or minification of the light transmission and a phase zone plate in the lens will control the relative intensity of light at various focal points, and in this respect will create foci at the higher orders. This is simply illustrated by lens devices utilizing a phase zone plate that is a Fresnel zone plate possessing zone spacing according to $\sqrt{k}$ with parabolically shaped echelettes (which means they exhibit a linear profile in $r^2$ space) that have a depth that accord with the design wavelength; e.g., if the design wavelength is yellow light which measures 555 nanometers, then the physical depth (or optical path length) of the echelette will be about 0.00555 millimeters, according to the relationship $\lambda/(\eta'-\eta)$ where $\eta'\simeq1.43$, $\eta\simeq1.33$ and $\lambda$ is the design wavelength, in this case that of yellow light. This phase zone plate, regardless of whether the carrier power of the lens body is divergent or convergent or plano, will be a monofocal lens device for the design wavelength and will direct all of the light of the design wavelength to the first order focal point along the axial axis of the optic zone. This means that a user of the lens device will see only near objects and will not be able to see distant objects even though the carrier power of the lens would, in a smooth lens device relying on the mathematical relationships utilized in refraction, allow visual transmission of distant objects. The phase zone plate is directing the light by diverting it to the near focal point. The lens structurally is the carrier for the phase zone plate. In this case, the phase zone plate is dictating the direction in which light is transmitted and is determining visual precision at the various focal orders. Moreover, in a bifocal lens of the Cohen lens design, in which light is transmitted to the $0^{th}$ order, the phase zone plate will contribute to the chromatic intensities at the $0^{th}$ order of wavelengths other than the design wavelength. Though the image at the $0^{th}$ order is not per se changed, it is affected by the phase zone plate. Regardless of the location of the $0^{th}$ order with a lens utilizing a phase zone plate in the optic zone, all light going to the $0^{th}$ order is transmitted through the phase zone plate, and thus is diffracted light.

From the preceding, there is demonstrated the fact that a smooth optic zone will direct light to only one focal power, i.e., the $0^{th}$ order, and a phase zone plate optic zone, utilizing diffraction, can direct light to only one focal power, the $1^{st}$ order. It is the dominating directional power of diffraction in this case which diverts the light to the $1^{st}$ order. The Cohen lens design, in its uniqueness, utilizes diffraction to direct light to more than one focal power. It directs the light to more than one focal power by utilizing phase shifting by either (i) cutting into the phase zone plate to alter its thickness according to an appropriate scheme or (ii) altering the refractive index of the lens body at zones within the phase zone plate. By varying the inclination of the zones it is possible to vary, thus phase shift, the transmitted light.

The Cohen lens design employs, in one embodiment, alternating and inclined half-period zones which are termed odd and even zones to obtain a multifocal effect. Each such zone reduces the thickness of the carrier lens body by the degree of the inward inclination. This kind of inclination will optically phase shift the light being transmitted by the lens in a varying relationship. The more pronounced the variation in phase shifting, the more light is directed or diverted to the higher orders. If the inclination is relatively less, the variation in phase shifting is less and more of the transmitted light will be directed from the lens surface to lower order focal points. It is through these variations in inclination and the profile of the inclination that one may dictate the direction of diffracted light to more than one focal power.

The Cohen lens design also teaches variations in refractive index through the use of embedded materials in surfaces of the lens as another mechanism other than surface relief profile to control phase shifting.

The inclined zones of the Cohen lens design follow the principles of Fresnel zones as discussed by H. Ruhle, U.S. Pat. No. 3,004,470, patented Oct. 17, 1961, except that the Cohen lens design incorporates the $\sqrt{k}$ spacing. Ruhle shows that a stepped Fresnel parabolic lens zone is nothing more than a smooth version of stepped inclined pairs of surfaces.

In a multifocal phase zone plate of a Cohen lens design, the alternating odd and even zones provide variations in the optical path length to phase shift the transmitted light. These zones may reside within a full-period zone or exist through the use of multiple half-period zones. A full-period zone is defined by the smallest repetitive sequence of facets within a phase zone plate which are spaced substantially proportional to $\sqrt{k}$. Such spacing is characterized by the formula:

$$r_k = \sqrt{2kd\lambda}$$

where d represents the $1^{st}$ order focal length and $\lambda$ is the design wavelength. A half-period zone, for the purposes of this invention, is characterized by the formula:

$$r_k = \sqrt{kd\lambda}$$

A full-period zone in a phase zone plate is recognized as comprising a pair of alternating zones having half-period spacing. A full-period zone may contain noncontinuous blazing or continuous blazing. A full-period noncontinuous blazing constitutes an independent profile that contains a discontinuity usually at about the half-period thereof and a full-period continuous blazing constitutes an independent profile that is free of discontinuities that are in the form of steps, that is, it is continuous, over the width of the full-period. Since each half-period zone of a full-period zone differs to the extent that incident light of the design wavelength is phase shifted differently, each zone will contribute to the ingredients necessary to directing or diverting light to multiple focal points.

It has been pointed out in the prosecution of De Carle, U.S. Pat. No. 4,704,016, patented Nov. 3, 1987, that "[T]he Fresnel zone plate or lens operates on the principle that adjacent zones pass light which is mutually out of phase by a half period so that if alternate zones are blacked out, the light passing through the plate and arriving at a point distant from the zone plate will be brighter than in the absence of the zone plate because destructive interference has been avoided. In order to achieve this effect, it can be shown mathematically that the radii bounding the zones are, to a first approximation, equal to:

$$\sqrt{nf\lambda} \text{ and}$$

$$\sqrt{(n+1)f\lambda}$$

where f = zone plate focal length, n = 0, 1, 2, 3, 4..., and $\lambda$ = wavelength of the light. In the case of a zone plate having a power of, for example, 5 diopters, which is a typical power of ophthalmic lenses, the size of the first zone would be of the order 0.3 mm while the width of the eighth zone would be of the order of a few hundreths of a millimeter. The efficiency in terms of the sharpness of the image focused by the zone plate will increase with the number of zones so that for reasonable optical properties a plate with a large number of zones is desired."

Freeman and Stone, *Transaction BCLA Conference* 1987, page 15, utilize about 6 full-period zones for a +1 Diopter add. That would translate into 12 half-period zones.

Thus there has been a recognition by some skilled in the art that lenses of the Cohen lens design require a substantial number of zones to achieve a sharp image. However, lenses which necessitate the presence of such a large number of zones in a bifocal lens would deprive a significant number of people from the benefits of contact and intraocular lenses of the Cohen lens design.

There are many eye conditions which require special variations in the design of the phase zone plate of a Cohen lens design. For example, cataract patients are generally older in years and therefore have small pupils. In such cases, their treatment can involve the implantation of an intraocular lens (IOL). There are situations where it is desirable to use an IOL containing a bifocal phase zone plate. Because of the pupil reduction in such patients, the phase zone plate should be operative within a very small aperture to accommodate the size of the pupil. In addition, because of the placement of a phase zone plate IOL within the eye, the aperture stop would be reduced to about 85% of the apparent pupil size. Therefore, the phase zone plate should be operative in a region smaller than the iris size which is only 85% of the apparent pupil size.

There is the need for a bifocal contact or IOL optical device which solves the pupil reduction problem by providing a reasonable number of discontinuities within a small optic zone so as to accommodate a small pupil size such as exists in the case of cataract patients.

THE INVENTION

This invention relates to a lens possessing the Cohen lens design and provides a resolution of the problem of providing a bifocal lens usable as an IOL or as a contact lens by incorporating a phase zone plate that accommodates a small pupil size, such as exists in the case of cataract patients.

The invention embraces an optical element containing a phase zone plate containing annular concentric zones possessing blazed facets which splits light to at least two distinct focal points and which may utilize a single full-period zone of a phase zone plate.

The invention encompasses a diffractive bifocal optical element comprising a phase zone plate containing annular concentric zones in which the zones are spaced substantially proportional to $\sqrt{k}$, the odd zones possessing blazed facets with an optical path length (depth) one-half the optical path length (depth) of the even facets and discontinuous jumps in the profile only at the odd radii. This element splits the light into two focal points even when restricted by an aperture stop as small as one full-period zone.

This invention relates to a lens device containing a multiple focal point profiled phase zone plate which provides two or more distinct focal points even when used with aperture stops as small as one full-period zone. The phase zone plate has blazed facets comprising a plurality of annular concentric zones spaced according to the formula $$r_k = \sqrt{\text{constant} \times k},$$

where k is a zone and is equal to 1, 2, 3, etc., as the zones progress from the central axis of the phase zone plate to the periphery of the phase zone plate, in accordance with the Cohen lens design. In this formula, $r_k$ is the half-period zone radii, with the zones and zone radii being odd or even in accordance with the value of k as k alternates progressively odd and even from the central axis to the periphery of the phase zone plates. In this invention, the depth of the odd half-period zones is about one-half the depth of the even half-period zones and each interface between an odd and even half-period zone at the even zone radii $r_k$, in which case k is an even number, exhibits a continuous profile with no discontinuous step.

BRIEF DESCRIPTION OF THE DRAWINGS

FIG. 5 shows the transmission of light emanating from a cross-sectional view of the phase zone plate design of FIG. 2 demonstrating the monofocal characteristic of the phase zone plate. It is important to note that no light is transmitted to the $0^{th}$ order.

FIG. 6 show the transmission of light emanating from a cross-sectional view of the phase zone plate design of FIG. 3 which is of a Cohen lens design, demonstrating the bifocal character of the phase zone plate. It is important to note that light is transmitted to the $1^{st}$ and $0^{th}$ orders.

FIG. 8 is a cross-section view of a full phase zone plate constructed according to the profile of FIG. 1. In this case, the phase zone plate accords with that of FIG. 6. This figure illustrates the wave effects derived from the diffraction characteristics of the phase zone plate and the directional capabilities of a phase zone plate to develop optical images at two foci.

FIG. 11B illustrates the odd and even zones by common fill patterns of the aperture phase zone plate of FIG. 10.

DETAILS OF THE INVENTION

This invention employs a multifocal optical device which utilizes a phase zone plate possessing $\sqrt{k}$ zone spacing and blazed facets in the zones. The zones radiate annularly as to each other and are cylindrically displaced from each other about a central axis. In a desired embodiment, there are alternating zones that differ sufficiently from each other that incident light transmitted through the phase zone plate will be displaced to a plurality of focal points configured on the central axis extending from the central axis of the phase zone plate. It is preferred that the intensities of light at at least two of the focal points are sufficient for viewing images at those focal points.

The invention utilizes a special zone relationship such that a minimum of zones are required to achieve useful images at more than one focal point taken along the central axis of the phase zone plate. It is a tribute of this invention that as little as one full-period zone comprising two half-period zones that differ, is all that is required to achieve a meaningful multifocal effect. However, the invention includes the use of more than one full-period zone of the desired phase zone plate design of the invention.

This invention in its preferred aspects utilizes a Cohen lens design to achieve a multifocal phase zone plate that is operative to achieve meaningful light intensities at two or more images when utilized with a minimum or small opening (aperture) of the entrance pupil of the eye. In a preferred embodiment, the invention is directed to a bifocal lens in which at least 20% of the incident light transmitted through the lens goes to the $0^{th}$ order and at least 20% of the incident light transmitted through the lens goes to the $1^{st}$ order.

Figure 1:
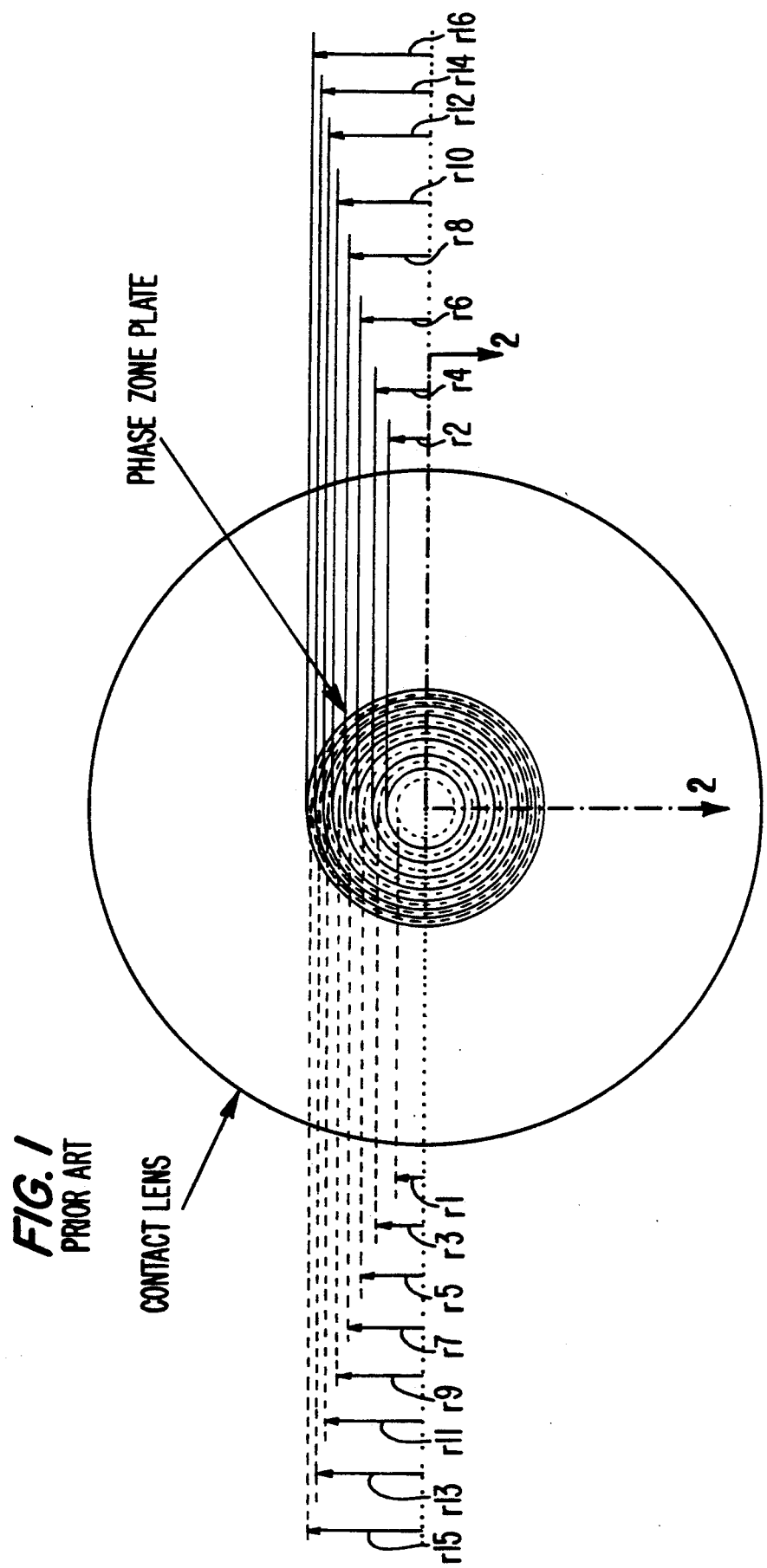
FIG. 1 is a front view of a lens device that can represent either a contact lens or an IOL, showing the $\sqrt{k}$ spacing of blazed facets encompassed by the Cohen lens design. All cross-sectional views hereafter depicted, with the exception of FIGS. 5, 6 and 8, are of a quarter section of the lens device possessing the phase zone plate design of FIG. 1, taken along lines 2—2.

In order to better understand the invention, reference is made to the drawings. FIG. 1 is a front view of a contact lens, and can also represent an IOL, showing the $\sqrt{k}$ spacing of blazed facets encompassed by the Cohen lens design. FIG. 1 shows a phase zone plate containing 16 zones, $r_1$ through $r_{16}$. The odd zones are $r_1$, $r_3$, $r_5$, $r_7$, $r_9$, $r_{11}$, $r_{13}$, and $r_{15}$. The remaining zones are the even zones. In this context, each zone may be a half-period zone if the smallest repetitive sequence of facets within the phase zone plate which are spaced substantially proportional to $\sqrt{k}$ is the combination of repetitive odd zone and even zone.

In FIG. 1, each odd zone is demarcated by hatched lines whereas each even zone is demarcated by solid lines. This characterization was chosen to signify that the odd zones are intended to be demarcated within the continuous profile of the full-period zone to which the contiguous even zone is a part.

Figure 2:
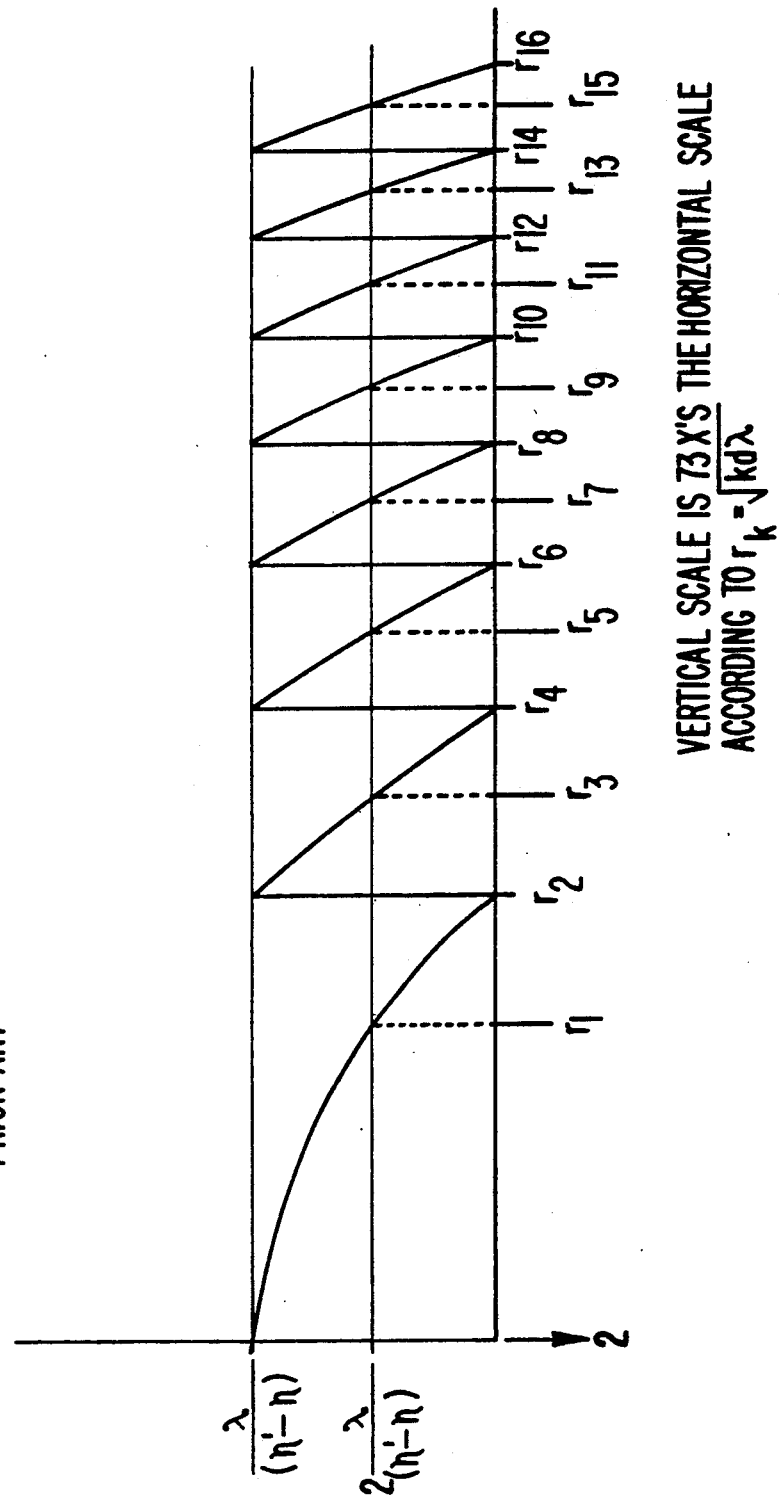
FIG. 2 is a cross-sectional view of a quarter section of a phase zone plate inclusive of that shown in FIG. 1. This figure shows a parabolic profile taken along lines 2—2 of FIG. 1, depicting a phase zone plate of a lens possessing the $\sqrt{k}$ spacing of FIG. 1, but differs from the Cohen lens design in that this profile with an echelette depth of $\lambda$ will not provide a multifocal effect.

FIG. 2 is a cross-sectional view of a parabolic profile taken along lines 2—2 of FIG. 1, depicting a phase zone plate of a lens possessing the $\sqrt{k}$ spacing of FIG. 1. However, the parabolic profile and echelette size of this phase zone plate does not accommodate the Cohen lens design because this profile with an echelette optical path length (depth) of $\lambda$ will not provide a multifocal effect. In this embodiment, not inclusive of the invention, the optical path length (depth) of each echelette is equal to $\lambda/(\eta'-\eta)$, in which $\lambda$ is the design wavelength of the lens, preferable that of yellow light, and $\eta'$ and $\eta$ are described above. In this specific combination of profiles, the odd and even zones are the same because the lens transmits the incident light to only one focal point, the $1^{st}$ order. In this case, the odd and even zones act exactly alike in their ability to divert the incident light. This indicates that they are the same and neither directs light to a focal point any different from the other.

Figure 3:
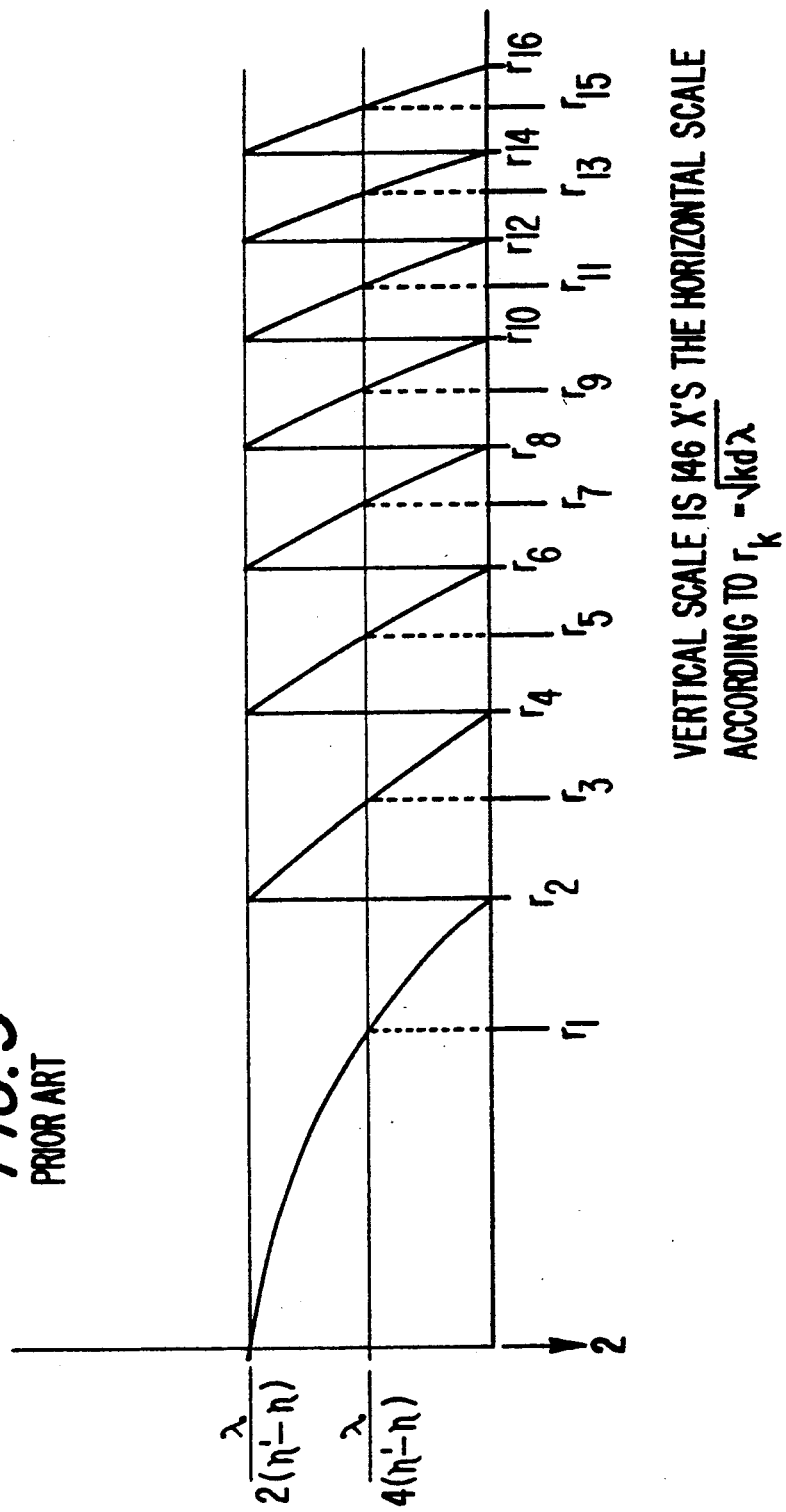
FIG. 3 is a cross-sectional view of a quarter section of another parabolic profile taken along lines 2—2 of FIG. 1, showing a phase zone plate of a lens incorporating the $\sqrt{k}$ spacing of FIG. 1. The parabolic profile and the echelette size of this phase zone plate does accommodate the Cohen lens design because this profile with an echelette depth of $\lambda/2(\eta'-\eta)$ will provide a multifocal effect.

FIG. 3 is a cross-sectional view of another parabolic profile taken along lines 2—2 of FIG. 1, showing a phase zone plate included within a lens of the design of the lens FIG. 1, i.e., possessing the $\sqrt{k}$ spacing of FIG. 1. The parabolic profile and the echelette size of this phase zone plate does accommodate the Cohen lens design because this profile with an echelette depth of $\lambda/2(\eta'-\eta)$ will provide a multifocal effect. In this particular embodiment, the angles of the respective odd and even zones are sufficiently different that each odd and even zone possesses multifocality. In that case, the odd zone possesses the ability to direct light to one focal point and the even zone possesses the ability to direct light to another focal point; and both possess the ability to direct light to both focal points. This will be more particularly discussed in the following.

Figure 4:
FIG. 4 is intended to show, in a cross-sectional representation, the true proportional dimensional relationships of height to width as well as profile, of the first echelette of FIG. 2, defined by the full period radius $r_2$.

In order to give some perspective to the relative dimensions of these phase zone plates, the relative dimensions of a single full period zone for the lens of FIG. 2 is illustrated in FIG. 4. FIG. 4 is a cross-sectional view of the first-full period zone containing odd zone $r_1$ and even zone $r_2$. It can be seen from this illustration that the depth of an echelette is very small and that the profile of the echelette is a gradually sloping one. The FIG. 4 depiction was computer generated and reflects the inability of the computer program to draw the profile of the echelette with accuracy and free of interruptions in the slope of the profile.

Figure 5:
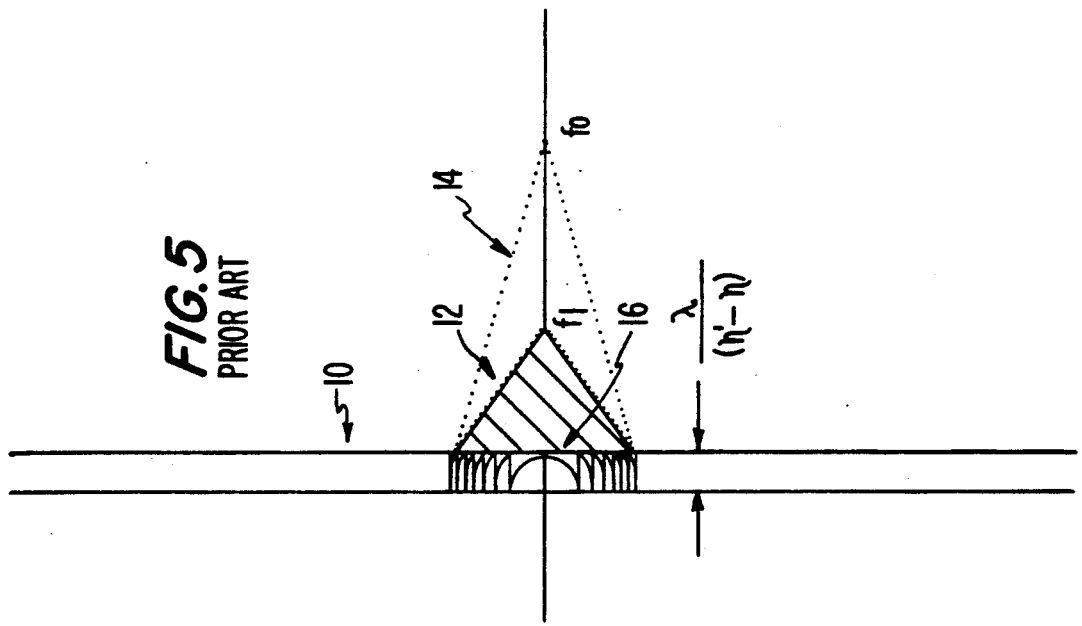

With respect to FIG. 5, there is shown a cross-sectional view of a phase zone plate 16 having echelettes according to FIG. 2 where the depth of each echelette is $\lambda/(\eta'-\eta)$, located in a plano lens body 10 (only a surface depth of the lens equal to the depth of the phase zone plate is shown). This figure illustrates the transmission of light 12 emanating from the phase zone plate to the $1^{st}$ order ($f_1$) with no light (14) being transmitted to the $0^{th}$ order ($f_0$). This demonstrates the monofocal characteristic of a phase zone plate utilizing the traditional parabolic profile when the depth of the blazing is $\lambda/(\eta'-\eta)$.

Figure 6:
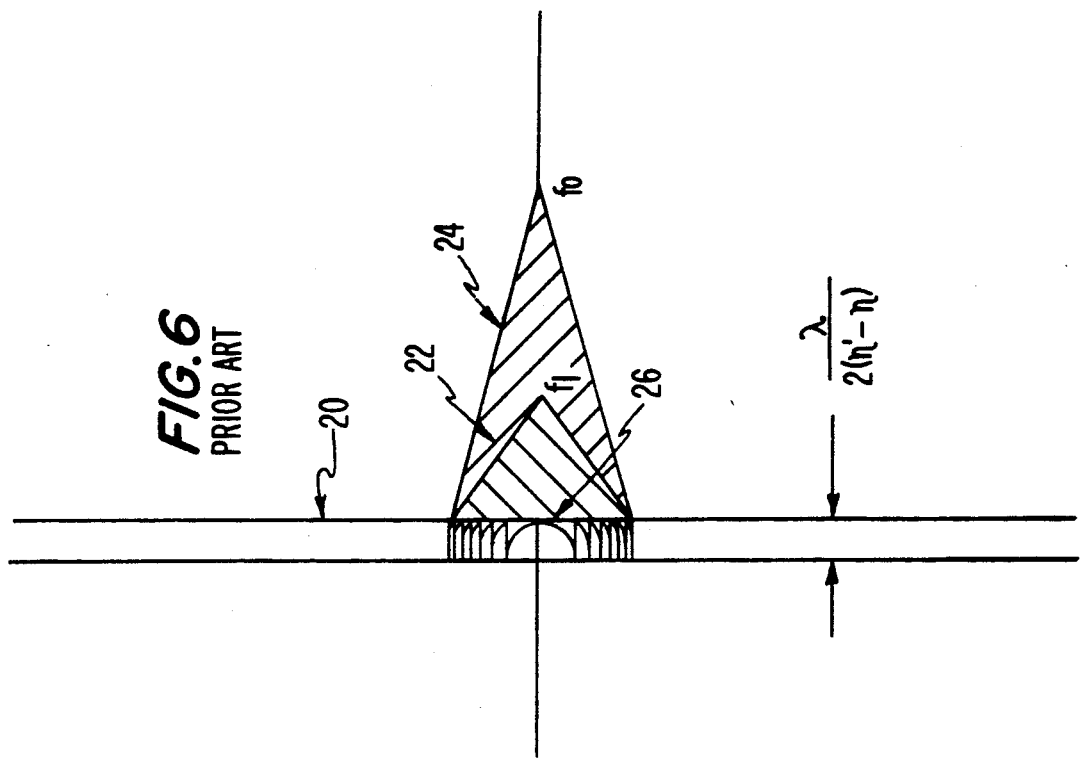
FIGS. 5, 6 and 8 represent half section views taken along the hatched line bisecting the phase zone plate.

FIG. 6 shows the effect of designing the depth of the echelette to $\lambda/2(\eta'-\eta)$. In FIG. 6, there is illustrated a phase zone plate 26 in a plano lens 20, exhibiting the same parabolic profile that is used in FIG. 5 but designed according to the description in FIG. 3. This figure demonstrates that the light transmitted through the lens is split and light 22 is directed to the $1^{st}$ ($f_1$) order focal point and light 24 is directed to the $0^{th}$ ($f_0$) order focal point. The nature of that split is described below.

Figure 7:
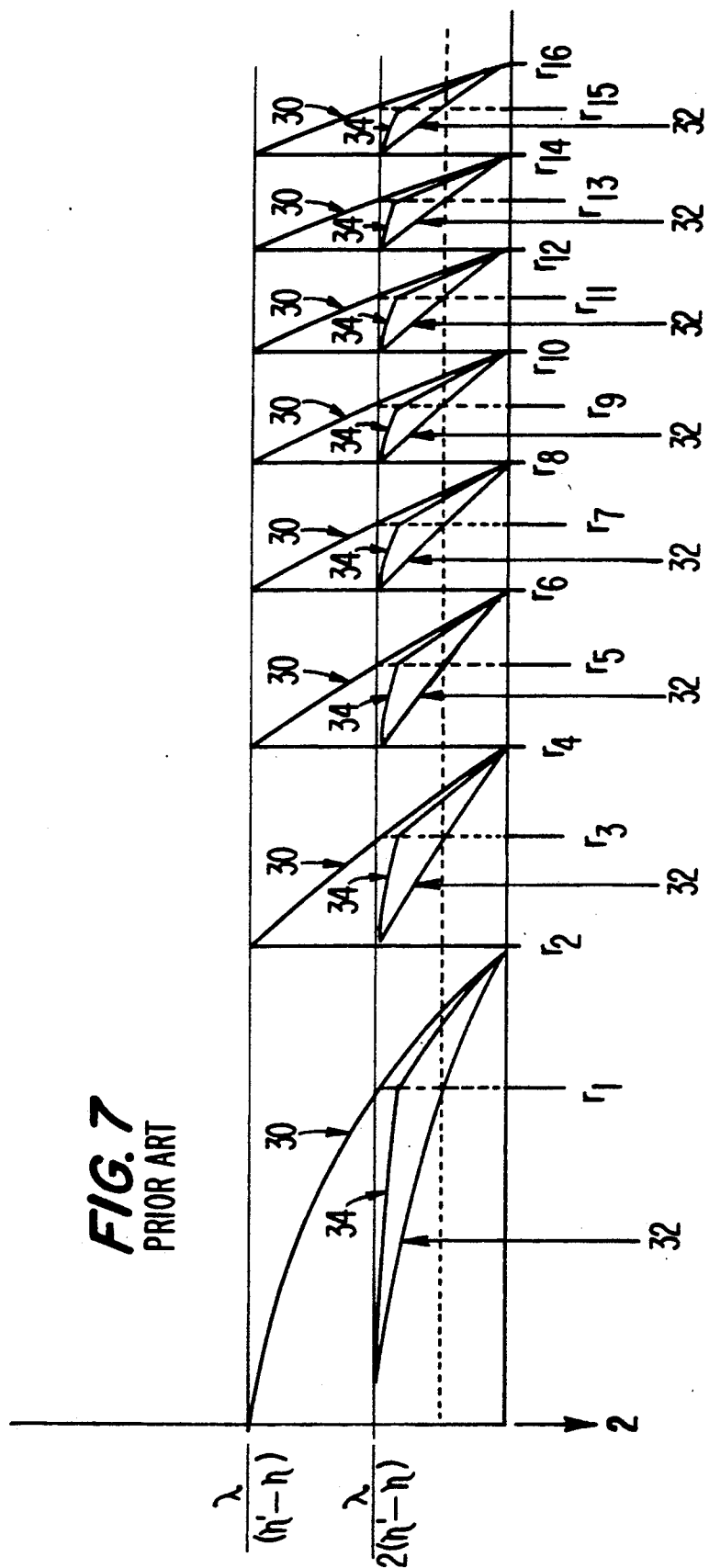
FIG. 7 compares the cross-sectional profile of a lens of the Cohen lens design possessing multifocal light transmission properties as illustrated in FIG. 3 and the cross-sectional profile of an example of a lens possessing the properties of FIG. 7 of Cohen, U.S. Pat. No. 4,210,391, to the cross-sectional profile of lens of FIG. 2 which provides a monofocal transmission characteristic.

FIG. 7 is a cross-sectional view of a variety of superimposed phase zone plates each having the spacing of the phase zone plate of FIG. 1. Its primary mission is to compare the profile of FIG. 2 to that of FIG. 3 and the profile of a phase zone plate profile taken from U.S. Pat.

No. 4,210,391. The profile represented by the parabolic curves 30 is the phase zone plate profile of FIG. 2, whereas the profile represented by the parabolic curves 32 is the phase zone plate profile of FIG. 3. However, also shown are the parabolic curves 34 of the profile based upon FIG. 7 of Cohen, U.S. Pat. No. 4,210,391. Each of the phase zone plates possess odd and even zones, the zones being half-period. The variety of echelette profiles vary in two optical path lengths (depth), $\lambda/(\eta'-\eta)$ and $\lambda/2(\eta'-\eta)$. This FIG. 7 compares the cross-sectional profile of a lens of the Cohen lens design possessing multifocal light transmission properties as illustrated in FIG. 3 herein, and the cross-sectional profile of an example of a lens possessing the properties of FIG. 7 of Cohen, U.S. Pat. No. 4,210,391, to the cross-sectional profile of lens of FIG. 2 which provides a monofocal transmission characteristic.

The profile of the echelettes in FIG. 7 illustrate that the profiles cut through the radii of the $r_{odd}$, or the perimeters of the odd zones, at a depth that is ½ that of the step of the echelettes. Thus, profile curves 30 cut through at each $r_{odd}$ boundary at a depth of $\lambda/2(\eta'-\eta)$, profile curves 32 cut through the radii of the $r_{odd}$ boundary at a depth of $\lambda/4(\eta'-\eta)$, and profile curves 34 cut through the radii of the $r_{odd}$ boundary at a depth intermediate of $\lambda/2(\eta'-\eta)$ and $\lambda/4(\eta'-\eta)$.

That profile characterized by curves 34 is based on the lens profile described in FIG. 7 of Cohen, U.S. Pat. No. 4,210,391, employing for that figure, the design parameters set forth at column 3, lines 20 and 21 of the patent. That lens yields an equal split of the incident light to the $1^{st}$ and $0^{th}$ orders of about 36%. The primary difference between that lens profile and the profile illustrated in FIG. 3 is the presence of a clear visual demarcation at the boundaries of the odd zone in the case of the profile formed by curves 34 while curves 32, at odd zone boundaries, are smoothed out.

The scale of the graphical depictions in FIGS. 2, 3 and 7 for the later full period zones in the phase zone plates make it difficult to visualize the parabolic shape actually present in the echelettes. FIG. 4 makes it easier to appreciate the relationship of the width of the zones relative to the elevation of the step forming the odd zones.

Figure 8:
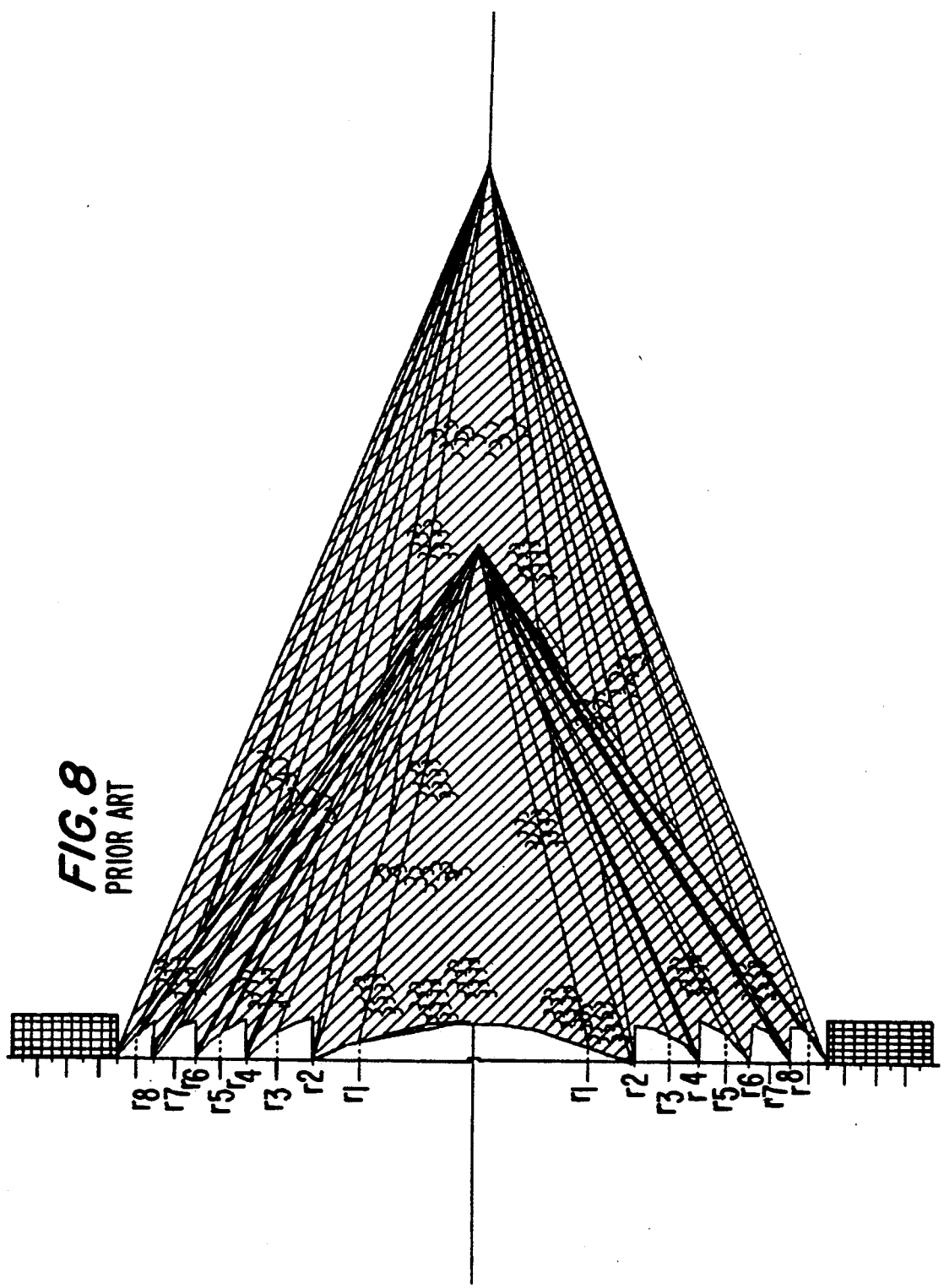

The consequence of the reduction in the depth of the parabolically profiled echelette from one wavelength deep to one-half wavelength deep can be seen in FIG. 8. FIG. 8 illustrates a cross-sectional view of a full phase zone plate constructed according to the profile of FIG. 1. In this case, the phase zone plate accords with that of FIG. 6 and utilizes the profile described in FIG. 3. This figure illustrates the wave effects derived from the diffraction characteristics of the phase zone plate and the directional capabilities of a phase zone plate to develop optical images at two foci. The light waves transmitted from the surface of the phase zone plate are directed by the phase zone plate to two primary focal points, the near $1^{st}$ focal point and the far $0^{th}$ focal point.

As pointed out in FIG. 5, if the depth of the echelettes in the FIG. 8 depiction were $\lambda/(\eta'-\eta)$, that is, one wavelength (design) deep, all of the incident light of that wavelength would be directed to the near $1^{st}$ order focal point. By shifting the angles of inclination of the odd and even zone, light is phase shifted and directed by the phase zone plate to one or more other focal points. In the case of FIG. 8, the other primary focal point is the far $0^{th}$ order.

Figure 9:
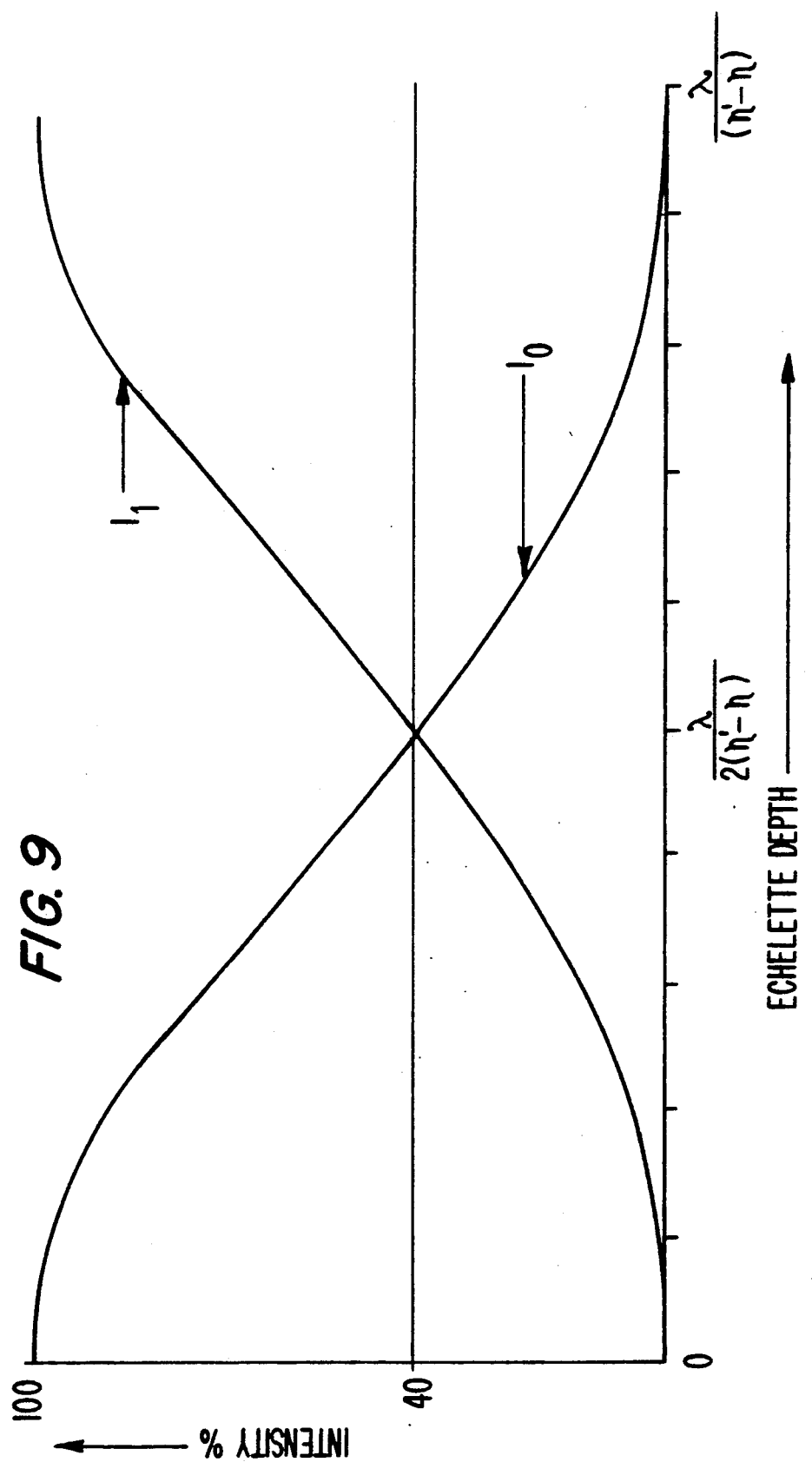
FIG. 9 is a graph showing the correlation of intensity of light observed at the $0^{th}$ and $1^{st}$ orders and the echelette depth of echelettes possessing parabolic profiles as illustrated in FIGS. 2 and 3 above.

FIG. 9 graphically demonstrates the correlation of intensity of light observed at the far $0^{th}$ and near $1^{st}$ orders and the depth of echelettes possessing parabolic profiles as illustrated in the previous figures. It shows that as the depth of the echellete is reduced below one-half wavelength (design), that is, $\lambda/x(\eta'-\eta)$, where x is greater than 2, more of the incident light is directed to the far $0^{th}$ order. As the depth approaches zero, more and more of the light intensity goes to the $0^{th}$ order and eventually multifocality is lost, i.e., not enough light intensity is directed to at least 2 focal points to provide useful images at those focal points, and a practical multifocal lens is not possible. This same phenomena can be seen with the increasing of echelette depth. As the depth increases, a proportionally greater amount of the light intensity is directed to the near $1^{st}$ order focal point. As the depth approaches $\lambda/(\eta'-\eta)$, more and more light is directed to the near $1^{st}$ order, and eventually multifocality is lost, i.e., not enough light intensity is directed to at least 2 focal points to provide useful images at those focal points, and a practical multifocal lens is not possible.

Figure 10:
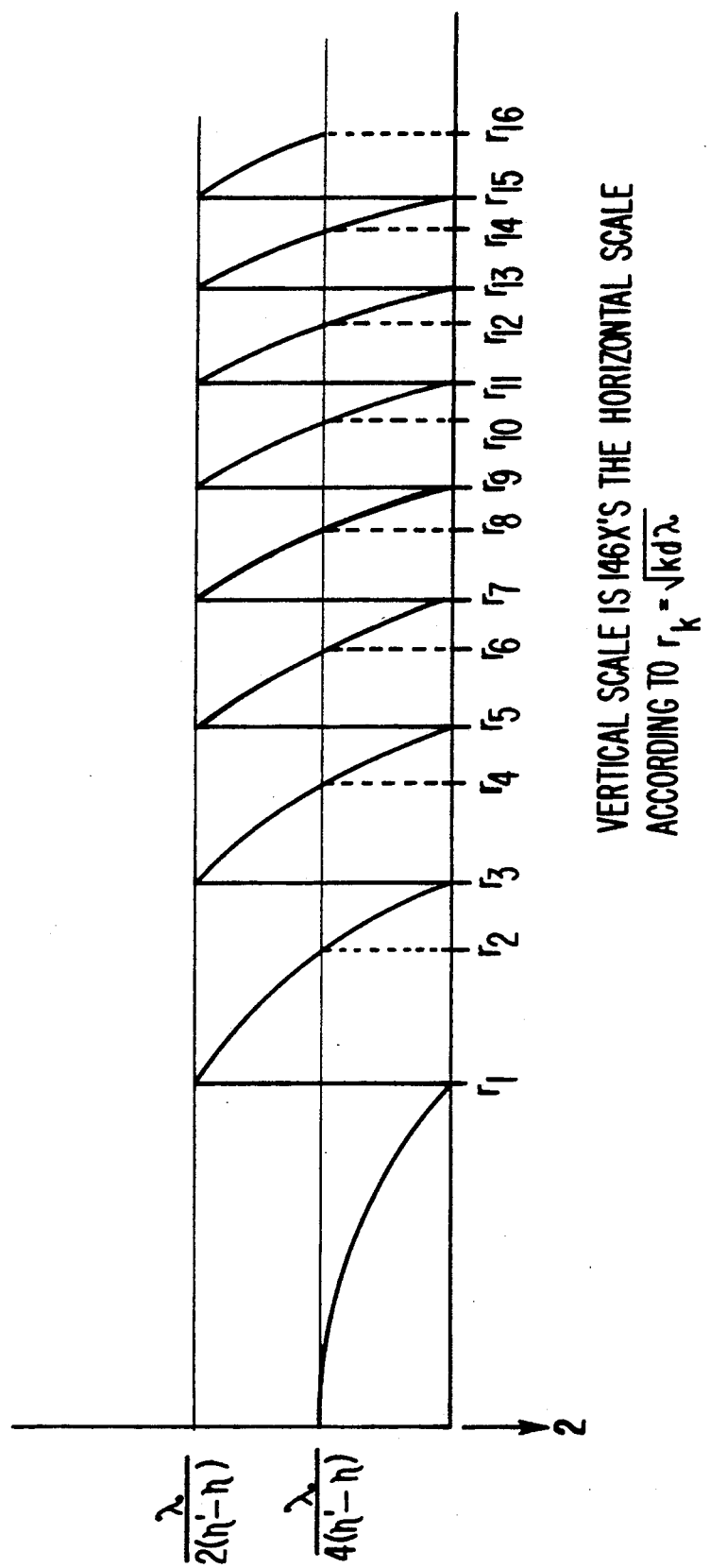
FIG. 10 is a cross-sectional view of a small aperture phase zone plate of this invention.

FIG. 10 is a cross-sectional view of an aperture phase zone plate possessing unique profile relationships and which provides additional insight into the functionality of multifocal lenses of the Cohen lens design. In FIG. 10, the odd zones are what one might view as the even zones of the phase zone plate profile of FIG. 3. In this instance, the odd zone $r_1$ has a depth of $\lambda/4(\eta'-\eta)$ and the even zones all start with a depth of $\lambda/2(\eta'-\eta)$. Each odd zone $r_3$ and greater forms a continuous profile with the profile of the contiguous even zone $r_2$ and greater. In this profile, the profile of the phase zone plate of FIG. 3 is translated by exactly one half-period zone.

This translation of the lens of FIG. 3 allows the lens of FIG. 10 to satisfy a patient's need for a phase zone plate that is operative within a very small aperture to accommodate the reduced aperture size of the pupil stemming from cataracts. It is through the translation of the odd and even zones that it is possible to provide a bifocal contact or IOL optical device which solves the pupil reduction problem by providing a reasonable number of discontinuities within a small optic zone so as to accommodate a small pupil size such as exists in the case of cataract patients.

The phase zone plate of FIGS. 3 and 6 was designed to produce equal intensities at both the $0^{th}$ order and $1^{st}$ order focal points. The intensities of light at these focal points are given as the squares of the vector amplitudes shown in the brightness graphs of FIGS. 12 and 13. A rotation (phase shift) applied to any of the vectors will have no effect on the light intensities. However, such vector rotations are realized by shifting (translating) the phase zone plate profiles.

Figure 11A:
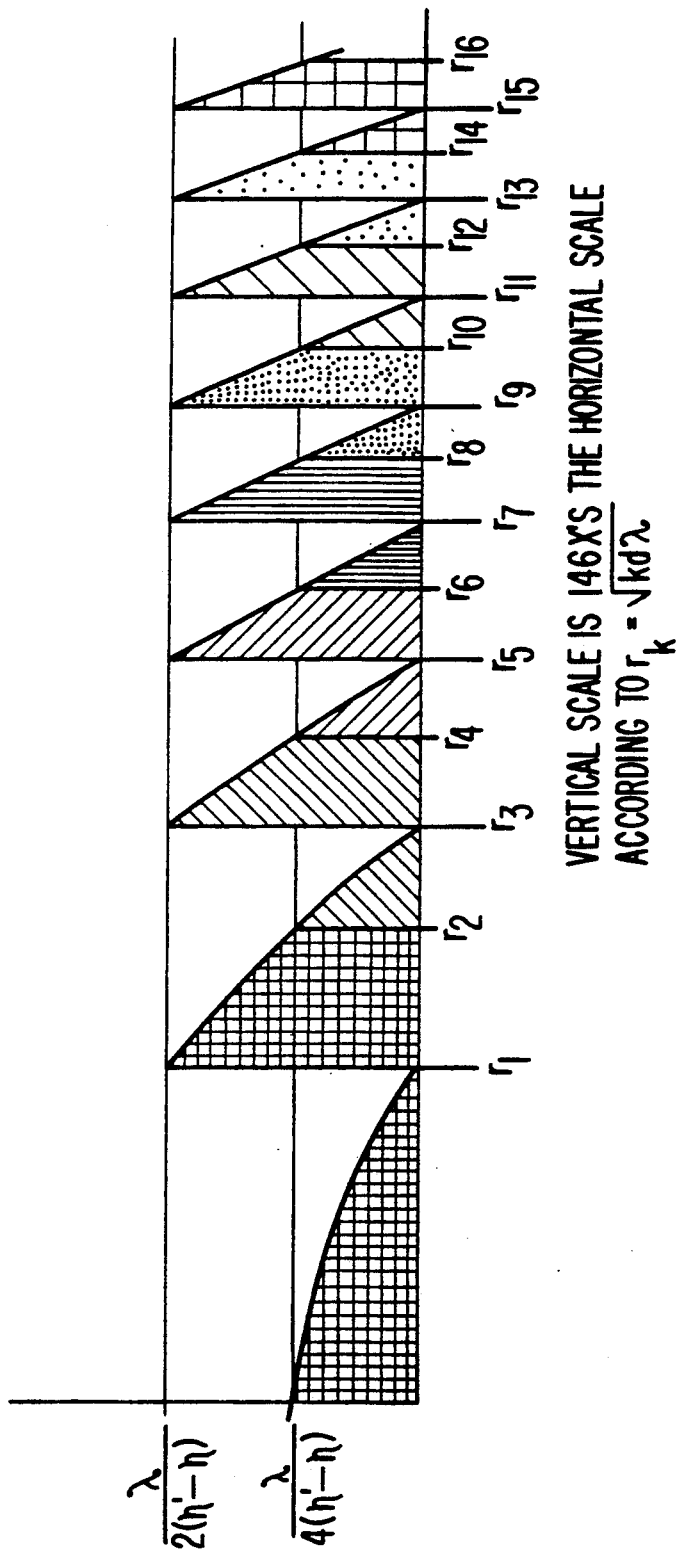
FIG. 11A illustrates by common fill patterns, the radii that combine to form the full-period zones of the small aperture phase zone plate of FIG. 10.

This advantage is further explained in the subsequent drawings. With respect to FIG. 11A, there is shown by common fill patterns, the radii that combine to form the full-period zones of the aperture phase zone plate of FIG. 10. On the other hand, FIG. 11B illustrates the odd and even zones by common fill patterns of the aperture phase zone plate of FIG. 10.

Figure 12:
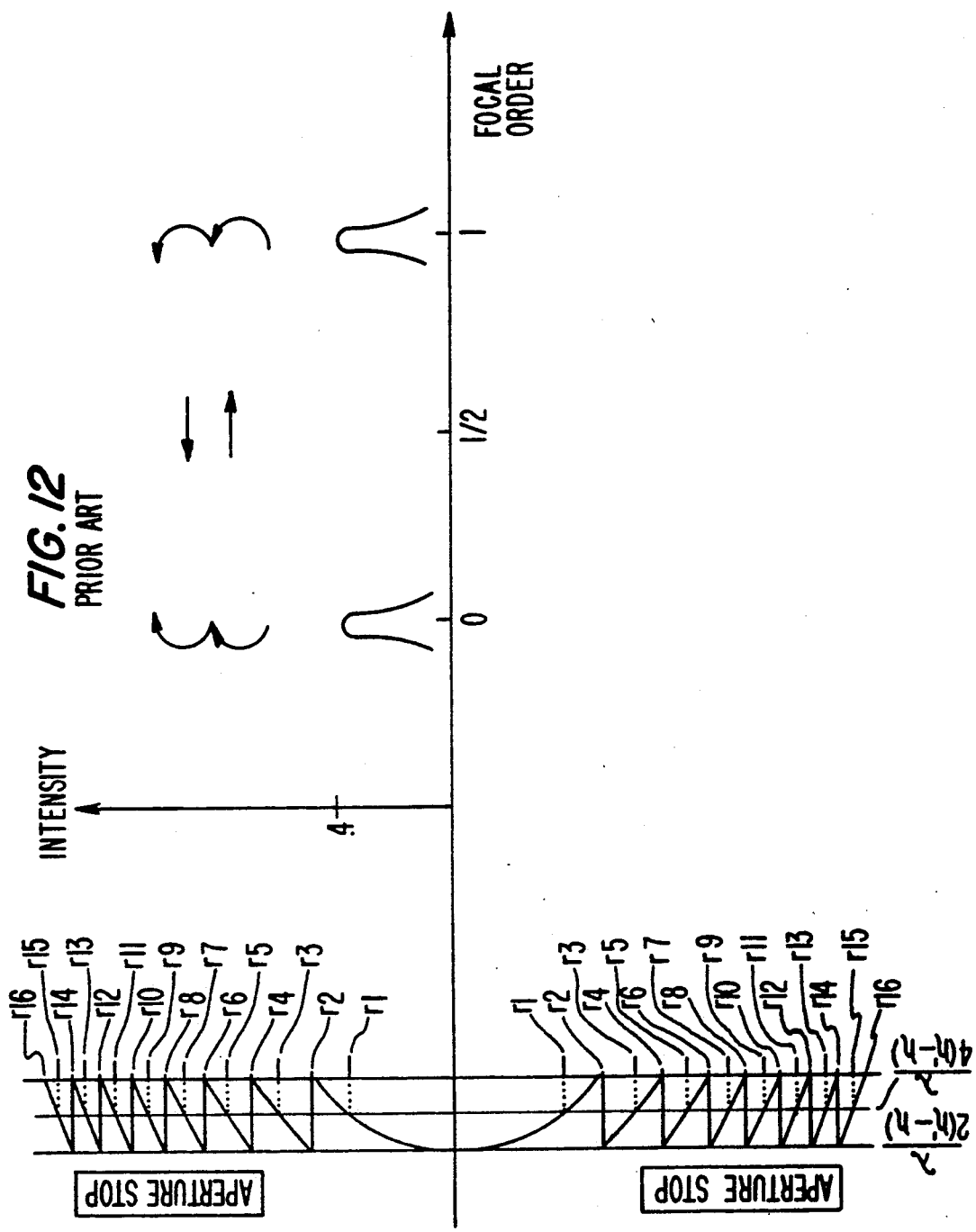
FIG. 12 characterizes the distribution of light and light intensity of the phase zone plate of FIG. 6, in conjunction with an aperture stop of two full-period zones.

FIG. 12 shows the lens of FIGS. 3 and 6 in conjunction with an aperture stop that restricts the incident light to two full-period zones and its corresponding graph of brightness versus focal power, showing two focal points of equal brightness. The standard vector representation for the light amplitude at that point is given above each focal order in the brightness graph.

Figure 13:
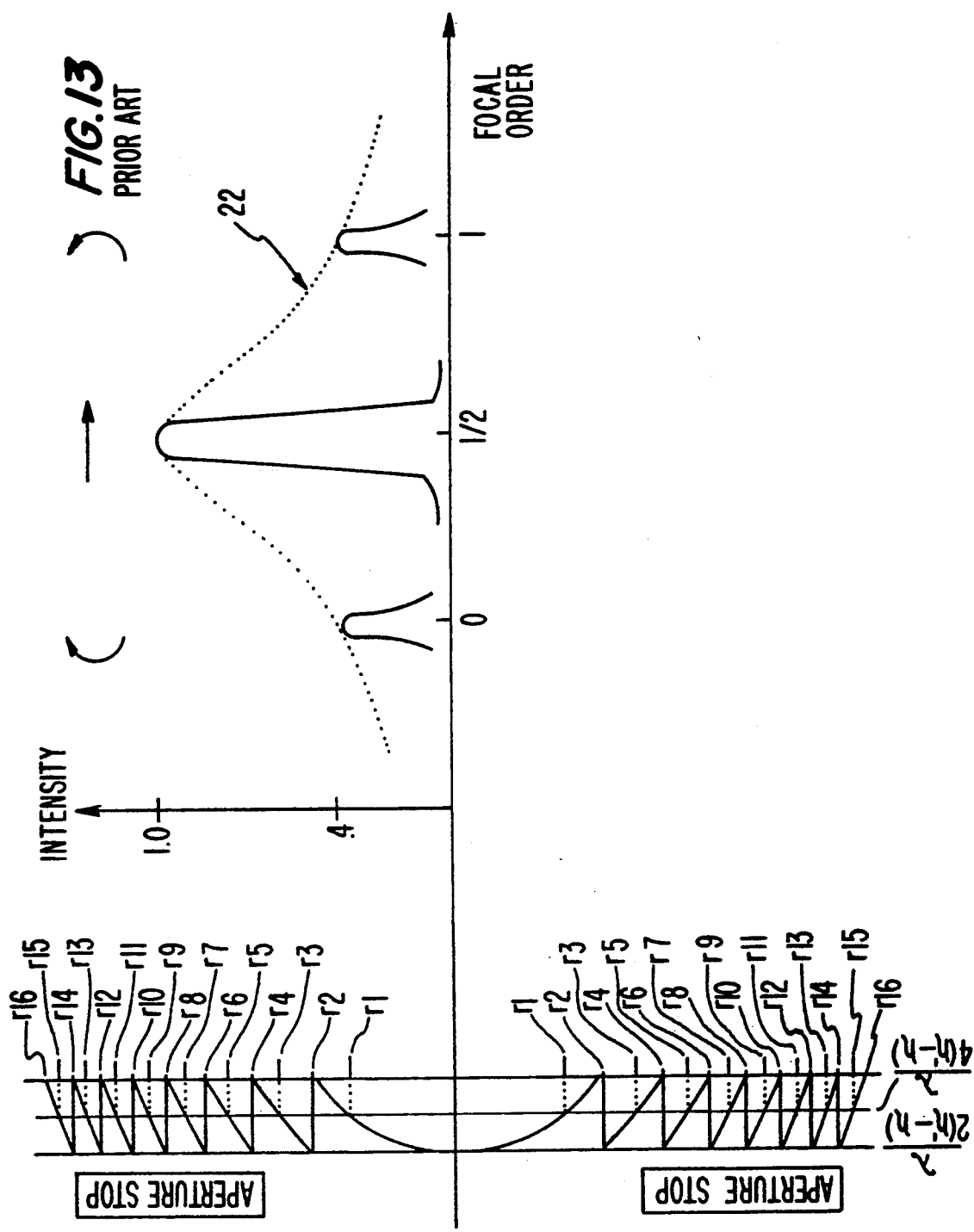
FIG. 13 shows the distribution of light and light intensity of the phase zone plate of FIG. 6, in conjunction with an aperture stop of one full-period zone.

When the aperture stop for the lens in FIG. 12 is reduced in diameter, so as to restrict the incident light to only one full-period zone, as diagrammed in FIG. 13, the large depth of field arising by reason of the pinhole effect masks the bifocality of the phase zone plate. In eliminating the second full-period zone, there is eliminated the light canceling vector at the one-half order image. The resulting envelope of intensity (dashed line 22 of FIG. 13) is that of a simple pinhole lens.

Figure 14:
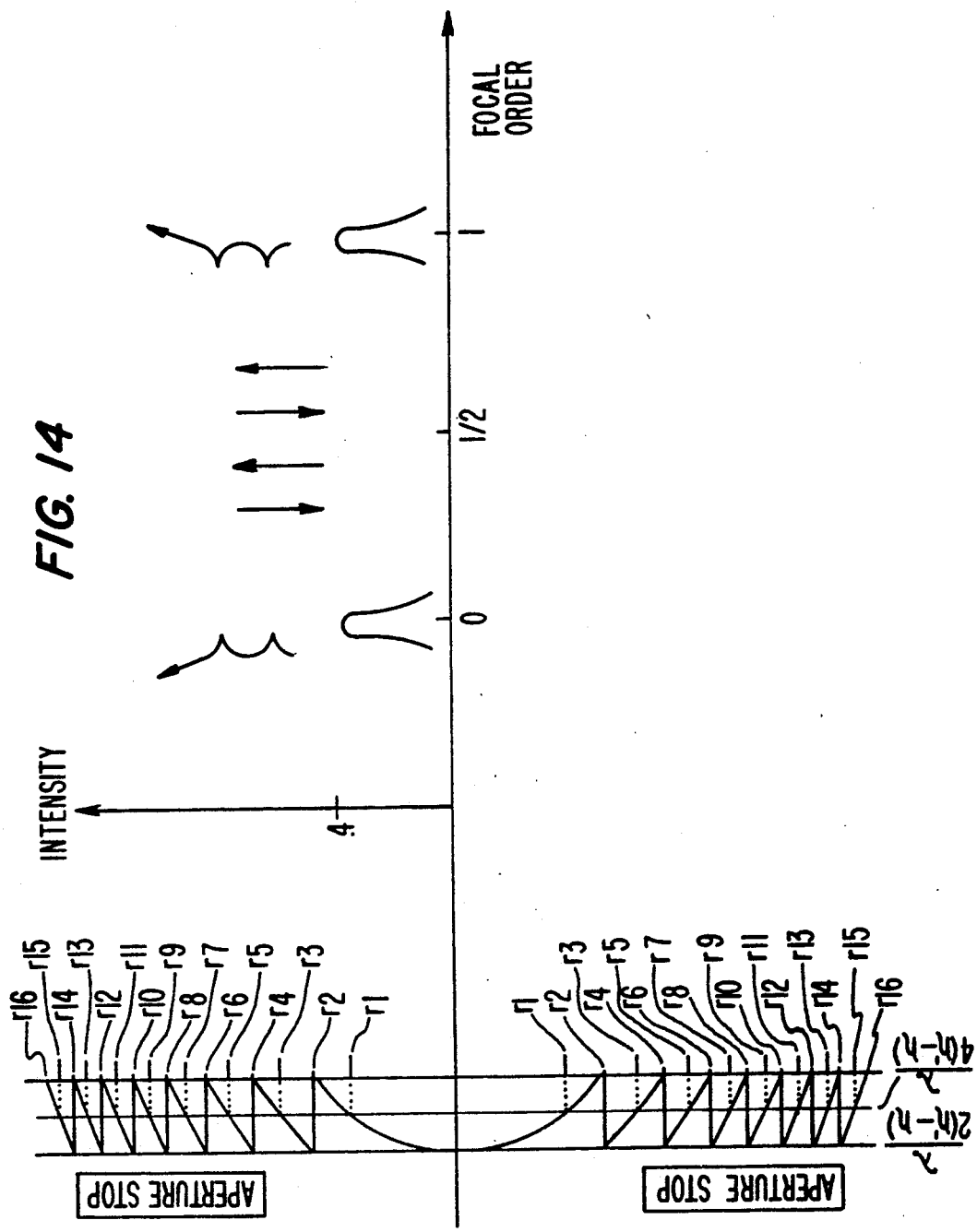
FIG. 14 shows the distribution of light and light intensity of the phase zone plate of FIG. 10, in conjunction with an aperture stop of two full-period zones.

FIG. 14 illustrates the cross-sectional view of a lens designed according to the profile of FIG. 10. FIG. 14 shows the lens in conjunction with an aperture stop restricting the incident light to two full-period zones and its corresponding graph of brightness versus focal power, showing two focal points of equal brightness. The standard vector representation for the light amplitude at that point is given above each focal order in the brightness graph. The vector diagrams of FIG. 14 are rotated with respect to the vector diagrams of FIG. 12.

Figure 15:
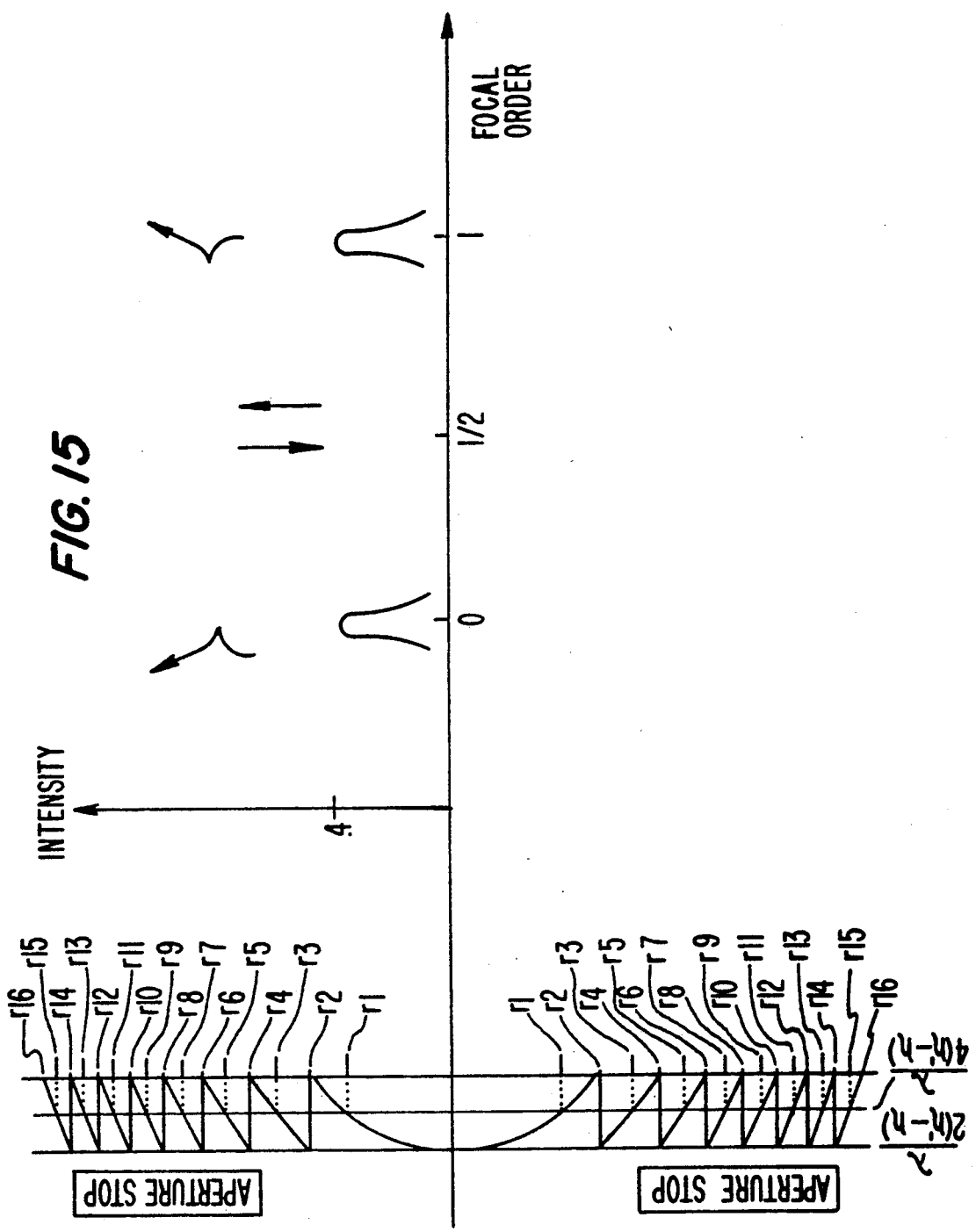
FIG. 15 shows the distribution of light and light intensity of the phase zone plate of FIG. 10, in conjunction with an aperture stop of one full-period zone.

FIG. 15 shows the distribution of light and light intensity of the phase zone plate of FIG. 10, utilizing an aperture stop of one full-period zone. FIG. 15 shows the lens of FIG. 10 in conjunction with an aperture that restricts the incident light to one full-period zone, and its corresponding graph of brightness vs. focal power, showing two focal points of equal brightness. The figure shows that when the aperture stop is reduced in diameter, so as to restrict the incident light to only one full-period zone, the bifocality of the phase zone plate is still very apparent. Even though the second full-period zone is eliminated, there is complete destructive interference of the light at the one-half order image. The resulting envelope of intensity remains that of a bifocal phase zone plate lens.

Figure 16:
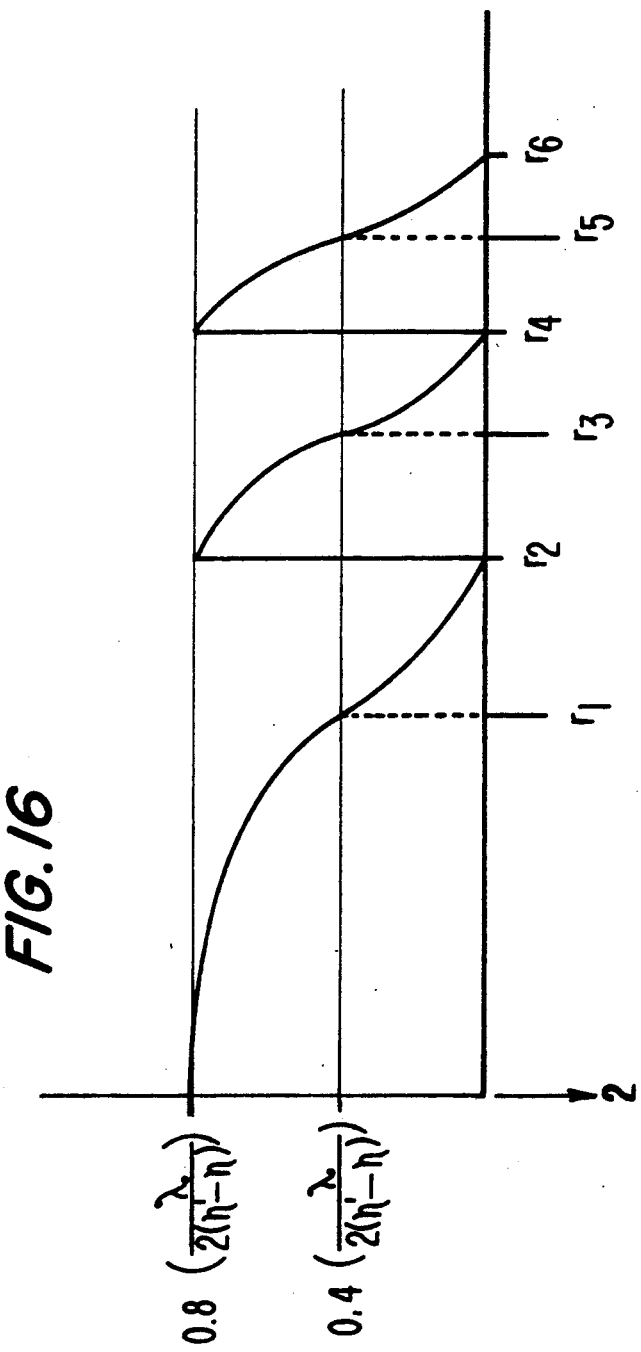
FIG. 16 shows the cross-sectional view of the profile of a phase zone plate described in copending application Ser. No. 222,000, filed Jul. 20, 1988 now abandoned.

FIG. 16 shows the cross-sectional view of the profile of a phase zone plate described in copending application Ser. No. 222,000, filed Jul. 20, 1988. The repetitive profile of this phase zone plate is given by $$d = D_0 \cdot \{\tfrac{1}{2} + \tfrac{1}{2} \cdot \cos(\pi \cdot r^2/b^2)\}.$$

The facet depth for an equal energy split is given by $$D_0 = 0.405 \cdot \lambda/(\eta - 1)$$

and the intensity split is given by $$I_1 - I_2 = J_0^2(0.405 \cdot \pi) = 0.403.$$

Figure 17:
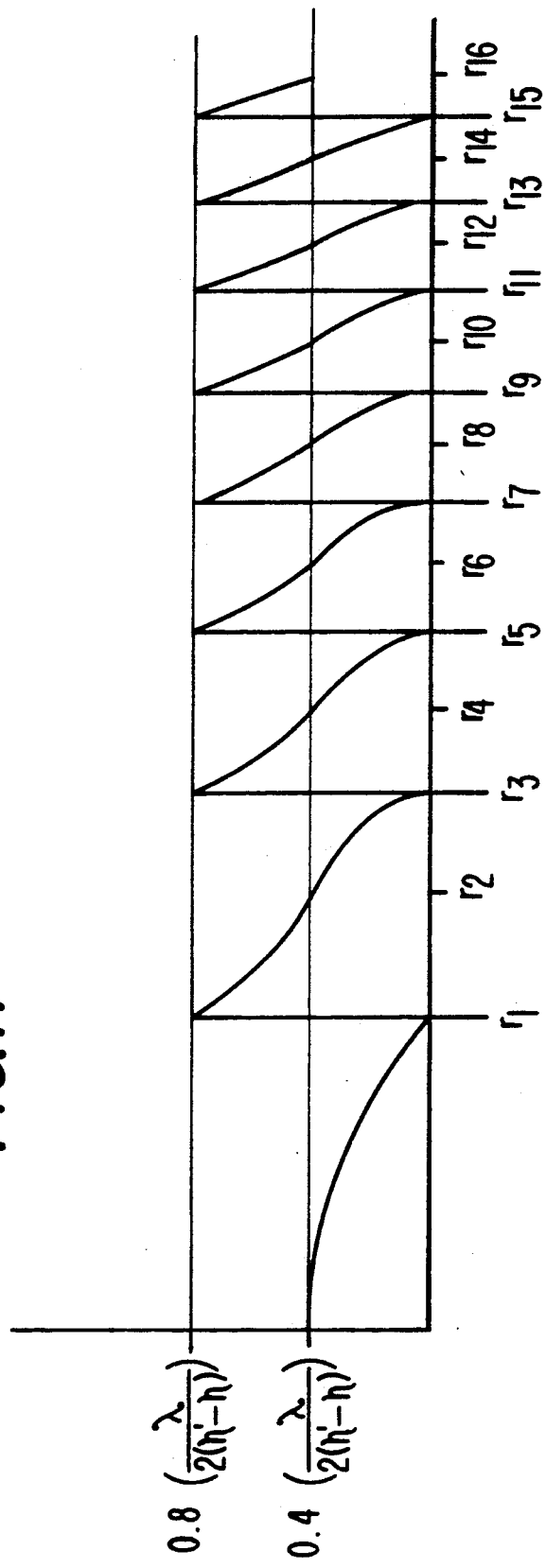
FIG. 17 is a cross-sectional view of an aperture lens of this invention utilizing the profile characteristics of the phase zone plate design illustrated in FIG. 16.

FIG. 16 illustrates the profile of a multifocal phase zone plate configured by cutting blazed facets of optical path length (depth) 0.4 wavelength deep, where the blazed facet has a cosine step profile. FIG. 17 is a cross-sectional view of an aperture lens of this invention utilizing the profile characteristics of the phase zone plate design illustrated in FIG. 16. FIG. 17 shows a portion of the profile of a phase zone plate created by translating the phase zone plate profile of FIG. 16 by exactly one half-period zone. The radii $r_k$ in FIG. 16, are marked off in half-period zones. And for this profile, when the aperture stop is reduced in diameter, so as to restrict the incident light to only one full-period zone the bifocality of the phase zone plate is not compromised.

It has been pointed out above that by translating the phase zone plate profile by one half-period zone, bifocality is maintained even with an aperture stop as small as a full-period zone. This is not to say that the quality of image seen under such circumstances would be as good as if the aperture stop were 2 or more full-period zones. The condition for which the lens of the invention has been developed is not accommodated by conventional phase zone plate designs because at low aperture stops, the patient would lose all bifocality with the conventional phase zone plate design. Thus, the invention provides a level of bifocality in performance at low aperture stops that is unattainable from the conventional phase zone plate design, regardless of the carrier lens in which the phase zone plate is incorporated.

I claim:

1. An optical device comprising an optical region disposed about an optical axis and a phase zone plate disposed in the optical region for causing light passing through the phase zone plate to converge to a plurality of focal points, the phase zone plate comprising a plurality of blazed facets which include a plurality of annular concentric zones spaced according to the formula $$r_k = \sqrt{\text{constant} \times k}$$

where k is an integer zone number measured along the device radially outward from the optical axis to the periphery of the phase zone plate, and $r_k$ are half-period zone radii, the zones including odd and even zones in accordance with the value of k as k alternates progressively odd and even from the optical axis to the periphery of the phase zone plate, the depth of the zones at the even zone radii $r_2, r_4, r_6, \ldots$ being about one-half the depth of the zones at the odd zone radii $r_1, r_3, r_5, \ldots$, a discontinuous interface being disposed between selected pairs of adjacent odd and even half-period zones at the odd zone radii $r_1, r_3, r_5, \ldots$, each selected pair of adjacent odd and even zones forming a continuous profile.

2. The optical device of claim 1 wherein the blazed facets cause light to be focused to at least two distinct focal points, selective adjacent ones of the blazed facets being disposed to form alternating stepped repetitive patterns in accordance with the $\sqrt{k}$ spacing.

3. The optical device of claim 1 wherein pairs of adjacent even and odd zones, the zone number of the even zone being smaller than the zone number of the odd zone, are disposed to form respective continuous profiles.

4. The optical device of claim 1 wherein the phase zone plate includes a surface that comprises a repetitive profile given by the formula $$d = D_0 \cdot \{\tfrac{1}{2} + \tfrac{1}{2} \cdot \cos(\pi \cdot r^2/b^2)\}$$

where $D_0 = 0.405 \cdot \lambda/(\eta - 1)$.

5. The optical device of claim 1 wherein the phase zone plate includes a surface having a parabolic repetitive profile.

6. The optical device of claim 1 in the form of either an intraocular or contact lens.

7. The optical device of claim 2 in the form of either an intraocular or contact lens.

8. The optical device of claim 3 in the form of either an intraocular or contact lens.

9. The optical device of claim 4 in the form of either an intraocular or contact lens.

10. The optical device of claim 5 in the form of either an intraocular or contact lens.

11. The optical device of claim 6 in the form of an intraocular lens.

12. The optical device of claim 7 in the form of an intraocular lens.

13. The optical device of claim 8 in the form of an intraocular lens.

14. The optical device of claim 9 in the form of an intraocular lens.

15. The optical device of claim 6 in the form of a contact lens.

16. The optical device of claim 7 in the form of a contact lens.

17. The optical device of claim 8 in the form of a contact lens.

18. The optical device of claim 9 in the form of a contact lens.

19. The optical device of claim 10 in the form of a contact lens.

20. A diffractive bifocal ophthalmic ocular lens comprising annular concentric zones spaced according to the formula $$r_k = \sqrt{k\lambda d}$$

where k is a positive integer representing the respective zones, $\lambda$ is a design wavelength in the visible spectrum, d is the first order focal length, and $r_k$ represents the respective zone radii, a discontinuous step being disposed only at the odd zone radii $r_1$, $r_3$, $r_5$, ..., each step having an optical path length approximately equal to $\lambda/2$.

21. An ophthalmic ocular lens with two primary focal points, the lens comprising a central zone and a plurality of peripheral blazed annular concentric zones, the zones being spaced substantially proportional to $\sqrt{k}$, with k being an integer zone number, each zone having a zone boundary, and a discontinuous step being disposed only at the odd zone boundaries, the discontinuous steps having a depth substantially equal to two times the depth of the central zone, the zones being disposed so that approximately 40% of the incident light at a design wavelength $\lambda$ in the visible spectrum is focussed to each of the two primary focal points.

22. The lens of claim 21, wherein the zones are disposed so that at least one of the two primary focal points corresponds to the zeroth diffraction order.

23. The lens of claim 22, in the form of either an intraocular or contact lens, wherein the depth of the steps is substantially equal to $\lambda/2$ with $\lambda$ being the design wavelength.

24. The lens of claim 23, wherein the design wavelength $\lambda$ lies approximately within the wavelength range of yellow light.

25. The lens of claim 23, wherein the zones are disposed so that the two primary focal points correspond to the zeroth and plus first diffraction orders, respectively.

26. The lens of claim 25, wherein the depth of the steps is substantially equal to $\lambda/2$ with $\lambda$ being the design wavelength.

27. The lens of claim 26, wherein the design wavelength $\lambda$ lies approximately within the wavelength range of yellow light.

28. A diffractive bifocal ophthalmic ocular lens for focusing light to two bifocal powers, the lens comprising a central zone and a plurality of peripheral blazed annular concentric zones disposed about the central zone, selected zones being separated by steps, the steps having essentially the same step height, the step height being substantially equal to two times the depth of the central zone, the annular area between adjacent steps being substantially equal to two times the annular area of the central zone, the zones being disposed so that the intensity of light focussed at each of the two bifocal powers is equal to about 0.40 of the incident light at a design wavelength $\lambda$ within the visible spectrum.

29. The lens of claim 28, wherein the zones are disposed so that at least one of the two bifocal powers corresponds to the zeroth diffraction order.

30. The lens of claim 29, wherein the step height is substantially equal to $\lambda/2$ with $\lambda$ being the design wavelength.

31. The lens of claim 30, wherein the design wavelength $\lambda$ lies approximately within the wavelength range of yellow light.

32. The lens of claim 28, wherein the zones are disposed so that the two bifocal powers correspond to the zeroth and plus first diffraction orders, respectively.

33. The lens of claim 32, wherein the step height is substantially equal to $\lambda/2$ with $\lambda$ being the design wavelength.

34. The lens of claim 33, wherein the design wavelength $\lambda$ lies approximately within the wavelength range of yellow light.

* * * * *